Jan. 18, 1927.

H. S. JANDUS

BUMPER SUPPORTING MEANS

Filed May 21, 1926

1,614,734

INVENTOR

Herbert S. Jandus
By Hull, Brock & West.
Attys.

Patented Jan. 18, 1927.

1,614,734

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER-SUPPORTING MEANS.

Application filed May 21, 1926. Serial No. 110,676.

This invention relates to means for supporting bumpers in operative relation to the vehicles with which they are employed and has for its general object to provide a simple and efficient means whereby bumpers may be adjustably secured to such vehicles. More limitedly, the invention comprises a clamp which is adapted to provide a pivotal connection between a bumper bar and a supporting arm having an eye formed at the outer end thereof.

It has been proposed to support bumper bars from the eyes on the ends of such arms by employing a U-shaped clamping member, the arms of which are pivotally connected to such eye by means of a bolt, the bumper bar being received between such eye and the vertical base portion of the clamping member; with a jam screw threaded into such base portion and serving by its adjustment to force one face of the bumper bar against the adjacent portion of the eye. While the means thus described has met with considerable success, the device is subject to the objections that the device is liable to loosen, through vibrations of the bumper and through light impacts due to slight movements of the bumper bar against the eyes on the supporting arms; also that such small movements tend to form a flat spot on the part of the eye engaged by the bar and cause the jam screw ultimately to loosen up. By virtue of the construction of the clamping device shown and described herein, I am enabled to overcome these objections and to provide at the same time an economical and effective clamping device which is adapted to withstand and accommodate all the ordinary incidents of use.

Figure 1:
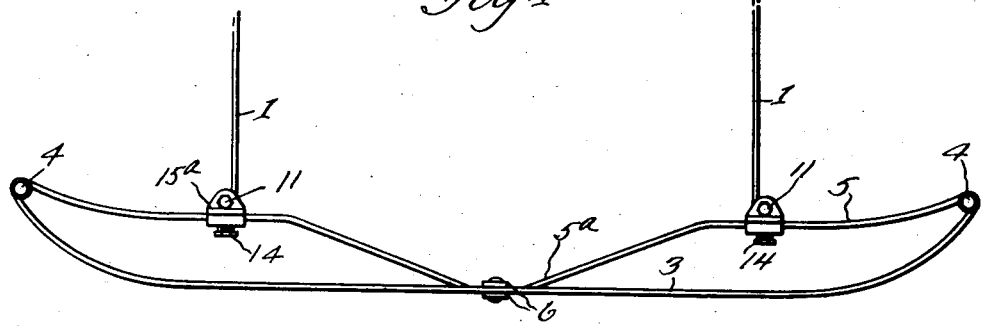
Figure 2:
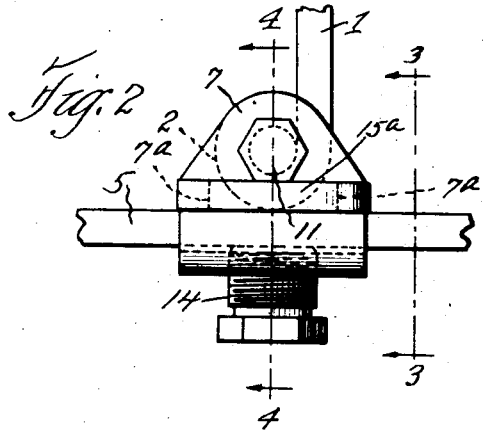
Figure 3:
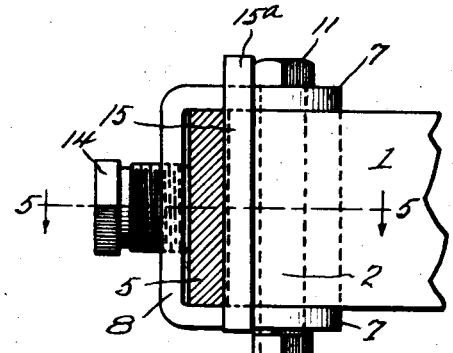
Figure 4:
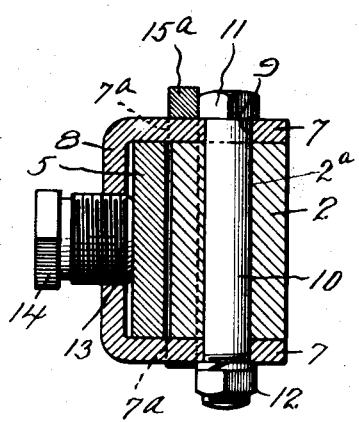
Figure 5:
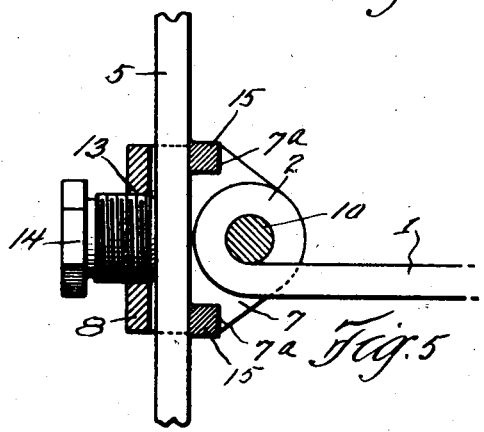

In the drawings forming part hereof, Fig. 1 represents a plan view of a bumper and its supporting arms, showing my invention applied thereto; Fig. 2 a detail in top plan view of a portion of the rear bumper bar, the clamping device, and the cooperating portion of one of the bumper supporting arms; Figs. 3 and 4 are details in section taken on the lines 3—3 and 4—4 of Fig. 2, respectively; and Fig. 5 a detail in section corresponding to the line 5—5 of Fig. 3, the supporting arm, bumper bar and jam screw being shown in elevation.

Describing the various parts by reference characters 1, 1 denote the supporting arms by which the bumper is secured to the end portions of the vehicle side members (not shown). Each of these arms is provided at its front or bumper-supporting end with an eye 2. The bumper illustrated herein and which is supported by the arms 1 is of the type shown in the McGregor Patent 1,372,154 issued March 22, 1921, and comprises a pair of vertically spaced impact bars 3 having their ends connected by bolts 4 with the ends of the rear or auxiliary bar 5, the central portion $5^a$ of said rear or auxiliary bar being projected toward and secured to and between the bars 3 by means of the plates 6 of a clamping device. The bumper in its details forms no part of the invention covered by this application, the one shown herein being selected for purposes of illustration and as providing a bar or member 5 (preferably a part of the bumper itself) by means of which the bumper may be secured to the arms 1. As will be noted from Figs. 3 and 4, the bar 5 is preferably of the same width as the arms 1, for convenience of applying the clamping devices thereto and to the eyes 2.

A clamping device is applied to the eye 2 on each of the arms 1. Each device disclosed herein comprises a U-shaped stirrup or member having top and bottom arms 7 and a vertical connecting web 8, the web 8 being of such height or width as to enable the arms 7 to be slipped upon and over the bar 5 and over the ends of the eye 2, the arms preferably engaging the upper and lower surfaces of the said bar and eye. The arms are provided with apertures 9, preferably of the same diameter as the bore $2^a$ of the eye, such apertures and bore being adapted to receive a pivot bolt 10 having a head 11 at the upper end and a nut 12 at the lower end thereof.

The vertical web 8 is provided with a centrally arranged threaded bore 13 for the reception of a jam screw 14.

The arms 7 are provided at their lateral edges with inwardly extending grooves or slots $7^a$, which slots are adapted to receive a U-shaped backing member for the rear face of the bar 5. This member comprises vertical legs 15 connected by an integral bar $15^a$, the backing member being applied to the clamping member with the U in an inverted position, whereby the backing member is prevented from dropping out of its seats in the clamping member should the parts become worn or loose.

It will be noted that the rear faces of the slots or grooves 7a are so located as to provide a clearance between the rear face of the bar 5 and the front end of the eye 2, whereby the pivotal action of the bumper is secured by the eye 2 and bolt 10 will not be affected, even though the jam screw 14 be set up tightly.

With the parts constructed and arranged as described, each of the clamping members 7, 8 will be applied to the bumper bar 5 with the flanges or arms 7 projecting across the top and bottom of said bar and across the top and bottom of the cooperating eye 2. The bolts 10 will be applied, after which the backing members 15, 15a will be shoved or driven downwardly into the respective seats provided therefor by the grooves 7a and the tops of the upper flanges 7. The jam screws 14 will then be set up to force the bumper bar 5 against the vertical legs of their respective backing members.

By the construction shown and described herein I have produced a very simple and efficient form of clamping device by means of which bumpers may be secured to the ends of their supporting arms and which will not only serve to maintain an efficient clamping action against the bars of the bumpers with which such devices are used but which will not interfere with the pivotal connections between the clamping devices and the supporting arms.

Having thus described my invention, what I claim is:—

1. The combination, with a bumper bar, of a substantially U-shaped clamping device applied to said bar and having substantially parallel members connected by a web, a supporting arm having an eye at the outer end thereof adapted to be received between said members, a bolt extending through the said eye and the said members and pivotally connecting the said device to said eye, backing means removably applied to the said clamping device and having a bar-engaging portion interposed between the eye and the face of the bar adjacent thereto, and means carried by said clamping device for forcing the said bar against the said backing means.

2. The combination, with a bumper bar, of a substantially U-shaped clamping device applied to said bar and having substantially parallel members provided with bolt-receiving apertures and connected by a web, the supporting arm having an eye at the outer end thereof adapted to be received between said members, a bolt extending through the said eye and the apertures in said members and pivotally connecting the said device to said eye, bar-engaging means carried by the said clamping device between the said web and the apertures in said members, and means carried by said web for forcing the face of the bar opposite said web against said bar-engaging means.

3. The combination, with a bumper bar, of a clamping device comprising a pair of substantially parallel arms adapted to receive the said bar therebetween and a web connecting the arms and from which said arms project, the said arms being provided each with laterally spaced seats, an inverted U-shaped backing device mounted in said seats and providing with the said arms and the said web a space for the reception of said bumper bar, a bumper supporting arm, means for securing to said arm the portions of the arms of the clamping device which extend beyond the said backing device, and means carried by said web for forcing the said bar against the legs of said backing device.

4. The combination, with a bumper bar, of a clamping device comprising a pair of substantially parallel arms adapted to receive the said bar therebetween and a web connecting the arms and from which said arms project, the said arms being provided each with laterally spaced seats, a U-shaped backing device mounted in said seats and providing with the said arms and the said web a space for the reception of said bumper bar, a bumper supporting arm, and means for securing to said arm the portions of the arms of the clamping device which extend beyond the said backing device.

5. The combination, with a bumper bar, of a clamping device comprising a pair of substantially parallel arms adapted to receive the said bar therebetween and a web connecting the arms and from which said arms project, the said arms being provided each with laterally spaced slots, a U-shaped backing device mounted in said slots and providing with the said arms and the said web a space for the reception of said bumper bar, a bumper supporting arm having an eye at the end thereof presented toward the bumper bar, said eye being inserted between the portions of the arms of the clamping device which extend beyond the said backing device, and a bolt extending through such portions of the said arms and through the said eye.

6. The combination, with a bumper bar, of a clamping device comprising a pair of substantially parallel arms adapted to receive the said bar therebetween and a web connecting the arms and from which said arms project, the said arms being provided each with laterally spaced seats, an inverted U-shaped backing device mounted in said seats and providing with the said arms and the said web a space for the reception of said bumper bar, a bumper supporting arm having an eye at the end thereof presented toward the bumper bar, said eye being inserted between the portions of the arms of the clamping device which extend beyond the said backing device, a bolt extending through such portions of the said arms and through the said eye, and means carried by the clamping device for forcing said bar against the legs of the backing device.

7. The combination, with a bumper bar, of a clamping device comprising a pair of substantially parallel arms adapted to receive the said bar therebetween and a web connecting the arms and from which said arms project, the said arms being provided each with inwardly extending slots at opposite lateral edges thereof the slots being located between the said web and the ends of said arms, a U-shaped backing device having the legs thereof fitted in said slots and forming with the said web a space for the reception of the said bumper bar, a bumper supporting arm, means for securing to said arm the portions of the arms of the clamping device which extend beyond the said backing device, and a jam screw threaded through the web of said clamping device for forcing the bumper bar against the legs of said backing device.

8. The combination, with a bumper bar, of a clamping device comprising a pair of substantially parallel arms adapted to receive the said bar therebetween and a web connecting the arms and from which said arms project, the said arms being provided each with inwardly extending slots at opposite lateral edges thereof, the slots being located between the said web and the ends of said arms, a U-shaped backing device having the legs thereof fitted in said slots and forming with the said web a space for the reception of the said bumper bar, a bumper supporting arm having an eye at the end thereof adapted to be received between the ends of the arms of the clamping device, a bolt pivotally securing the ends of such clamping arms to the said eye, and a jam nut threaded in said web for forcing the bumper bar against said backing device, the parts being arranged so that a clearance will be provided between the said eye and the portion of the bar adjacent thereto.

In testimony whereof, I hereunto affix my signature.

HERBERT S. JANDUS.